(12) United States Patent
Song

(10) Patent No.: US 10,823,243 B2
(45) Date of Patent: Nov. 3, 2020

(54) ACTUATOR FOR BRAKE DEVICE

(71) Applicant: MANDO CORPORATION, Pyeongtaek-si (KR)

(72) Inventor: Joon-Kyu Song, Seongnam-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 16/421,898

(22) Filed: May 24, 2019

(65) Prior Publication Data
US 2019/0360542 A1   Nov. 28, 2019

(30) Foreign Application Priority Data
May 24, 2018   (KR) .......................... 10-2018-0058703

(51) Int. Cl.
| F16D 65/18 | (2006.01) |
| F16D 125/50 | (2012.01) |
| F16D 125/42 | (2012.01) |
| F16D 121/24 | (2012.01) |

(52) U.S. Cl.
CPC .......... *F16D 65/18* (2013.01); *F16D 2121/24* (2013.01); *F16D 2125/42* (2013.01); *F16D 2125/50* (2013.01)

(58) Field of Classification Search
CPC .. F16D 65/18; F16D 2121/24; F16D 2125/42; F16D 2125/50; F16H 1/28; F16H 37/041
See application file for complete search history.

(56) References Cited

U.S. PATENT DOCUMENTS

| 2008/0153648 A1* | 6/2008 | Chen ...................... F16H 47/04 |
| | | 475/72 |
| 2015/0075923 A1* | 3/2015 | Jang ...................... F16D 65/18 |
| | | 188/162 |

(Continued)

FOREIGN PATENT DOCUMENTS

| JP | 2018-17300 A | 2/2018 |
| KR | 10-0722947 B1 | 5/2007 |

(Continued)

OTHER PUBLICATIONS

Korean Office Action dated Dec. 16, 2019 corresponding to Korean Application No. 10-2018-0058703.

*Primary Examiner* — Melanie Torres Williams
(74) *Attorney, Agent, or Firm* — Hauptman Ham, LLP

(57) ABSTRACT

The actuator includes a housing configured to have not only a motor accommodation part, but also a gear mounting part to which a deceleration gear unit is mounted. The gear mounting part includes not only a shaft hole formed to be penetrated at a center part of a top surface of the gear mounting part, but also a ring gear part formed along in an inner circumference of the gear mounting part. The deceleration gear unit includes a worm wheel configured to have a sun gear that is rotatably supported by an outer surface of the gear mounting part and is inserted into the gear mounting part through the shaft hole, a plurality of planetary gears engaged with the sun gear and the ring gear part within the gear mounting part, and a carrier coupled to the plurality of planetary gears to be rotatable, and provided with an output shaft.

13 Claims, 4 Drawing Sheets

(56) References Cited

U.S. PATENT DOCUMENTS

| | | | | |
|---|---|---|---|---|
| 2015/0175143 A1* | 6/2015 | Sun | ................. | B60T 13/746 |
| | | | | 74/89.16 |
| 2017/0023081 A1* | 1/2017 | Sala | ................. | F16D 55/226 |
| 2018/0283507 A1* | 10/2018 | Lee | ................. | F16H 7/1281 |
| 2019/0186191 A1* | 6/2019 | Eguchi | ................. | E05F 3/16 |

FOREIGN PATENT DOCUMENTS

| | | | |
|---|---|---|---|
| KR | 10-2011-0072877 A | 6/2011 | |
| KR | 10-2017-0110756 A | 10/2017 | |
| KR | 10-1836128 B1 | 3/2018 | |

\* cited by examiner

10

ACTUATOR FOR BRAKE DEVICE

CROSS-REFERENCE TO RELATED APPLICATION

This application is based on and claims priority under 35 U.S.C. § 119 to Korean Patent Application No. 10-2018-0058703, filed on May 24, 2018 in the Korean Intellectual Property Office, the disclosure of which is incorporated by reference in its entirety.

BACKGROUND

1. Field

Embodiments of the present disclosure relate to an actuator for a brake device, and more particularly to an actuator for a brake device to implement a parking function by an operation of a motor.

2. Description of the Related Art

In general, a brake device is a device for stopping a vehicle from moving when the vehicle is braked or parked, and serves to hold wheels of the vehicle so as to prevent the wheels from rotating.

Recently, an electronic parking brake (EPB) system to electronically control operation of a parking brake has been widely used throughout the world. Such an EPB system is mounted on a typical disc brake and performs a parking brake function. Here, EPB systems are classified into a cable-puller type EPB system, a motor-on-caliper (MOC) type EPB system, and a hydraulic-parking-brake type EPB system.

Korean Patent Laid-Open Publication No. 10-2011-0072877 (2011.06.29) has disclosed a motor-on-caliper (MOC) type electronic parking brake (EPB) actuator structure. This MOC-type electronic parking brake (EPB) actuator structure is connected to a motor producing drive power, decelerates the motor using a plurality of gear devices, increases torque of the motor, and transmits the increased torque to an actuator and a caliper device, such that the MOC-type electronic parking brake (EPB) actuator structure can allow the vehicle to be braked.

CITED REFERENCE

Patent Document

Korean Patent Laid-Open Publication No. 10-2011-0072877 (2011.06.29)

SUMMARY

Therefore, it is an aspect of the present disclosure to provide an actuator for use in a brake device for realizing miniaturization and operational stability in the actuator while having a simple structure in the actuator.

Additional aspects of the invention will be set forth in part in the description which follows and, in part, will be obvious from the description, or may be learned by practice of the invention.

In accordance with an aspect of the present disclosure, an actuator for a brake device includes a housing configured to have not only a motor accommodation part accommodating a motor therein, but also a gear mounting part to which a deceleration gear unit is mounted, and a casing coupled to an opened upper part of the housing. The gear mounting part is formed in a hollow cylindrical shape in which an upper part is closed and a lower par is opened, and includes not only a shaft hole formed to be penetrated at a center part of a top surface of the gear mounting part, but also a ring gear part formed along in an inner circumference of the gear mounting part. The deceleration gear unit includes a worm wheel configured to have a sun gear that is rotatably supported by an outer surface of the gear mounting part and is inserted into the gear mounting part through the shaft hole, a plurality of planetary gears engaged with the sun gear and the ring gear part within the gear mounting part, and a carrier coupled to the plurality of planetary gears to be rotatable, and provided with an output shaft.

The worm wheel may include a ring part and a cover part. The ring part may be formed to be penetrated at a center part thereof, and may include gear teeth formed in an outer circumference thereof. The cover part may be coupled to the ring part to cover an opened upper part of the ring part and an inner surface of the ring part.

The ring part may be formed of a synthetic resin material, and the cover part may be formed of steel.

The actuator may further include a worm member configured to transmit rotational force of the motor to the worm wheel.

The worm member may include a worm shaft provided with a gear part engaged with the worm wheel at an outer circumference thereof, and a bearing and a driven worm wheel respectively coupled to both ends of the worm shaft. The motor may include a rotary shaft coupled to a drive worm engaged with the driven worm wheel.

The worm wheel may be coupled to an upper part of the gear mounting part in a manner that the gear mounting part is accommodated into the worm wheel. The carrier may be inserted into and coupled to the gear mounting part at a lower part of the gear mounting part.

The gear mounting part may be detachably coupled to the housing.

The housing may include an extension panel coupled to the gear mounting part. A hook may be detachably coupled to the extension panel at a lower end of the gear mounting part.

The extension panel may include a plurality of stopper ribs spaced apart from each other by a predetermined distance in a circumferential direction, and at least one coupling rib engaged with the plurality of stopper ribs at the lower end of the gear mounting part.

The actuator may further include a damper member configured to support a lower end of the motor at a bottom surface of the motor accommodation part.

The worm wheel may be provided to cover a top surface and a side surface of the gear mounting part.

The worm wheel may include an accommodation space therein. The accommodation space may be configured to accommodate the gear mounting part so as to surround the gear mounting part.

The actuator may further include a carrier shaft part configured to penetrate a shaft hole of the sun gear at a center part of the carrier such that the carrier shaft part is rotatably supported by the casing.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
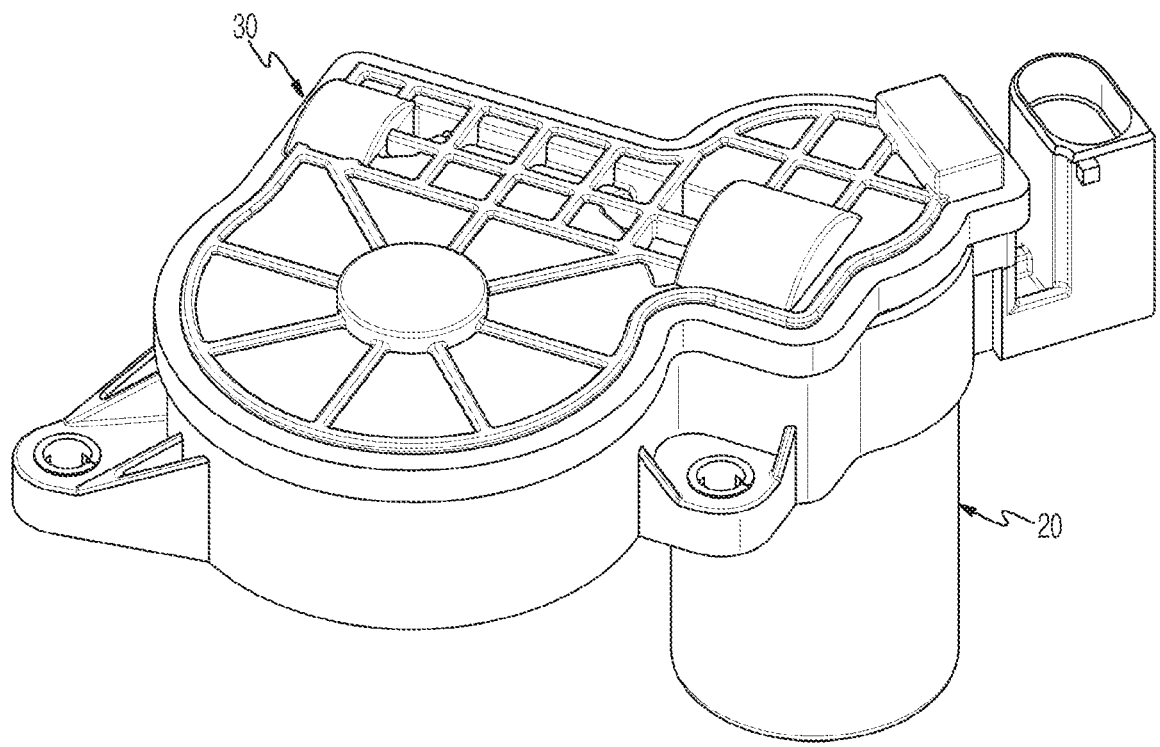
FIG. 1 is a perspective view illustrating an actuator for a brake device according to an embodiment of the present disclosure.

Reference will now be made in detail to the embodiments of the present disclosure, examples of which are illustrated in the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. In the drawings, the width, length, thickness, or the like of the component may be exaggerated or reduced for convenience and clarity of description. Throughout the disclosure, like reference numerals refer to like parts throughout the various figures and embodiments of the present disclosure.

Figure 2:
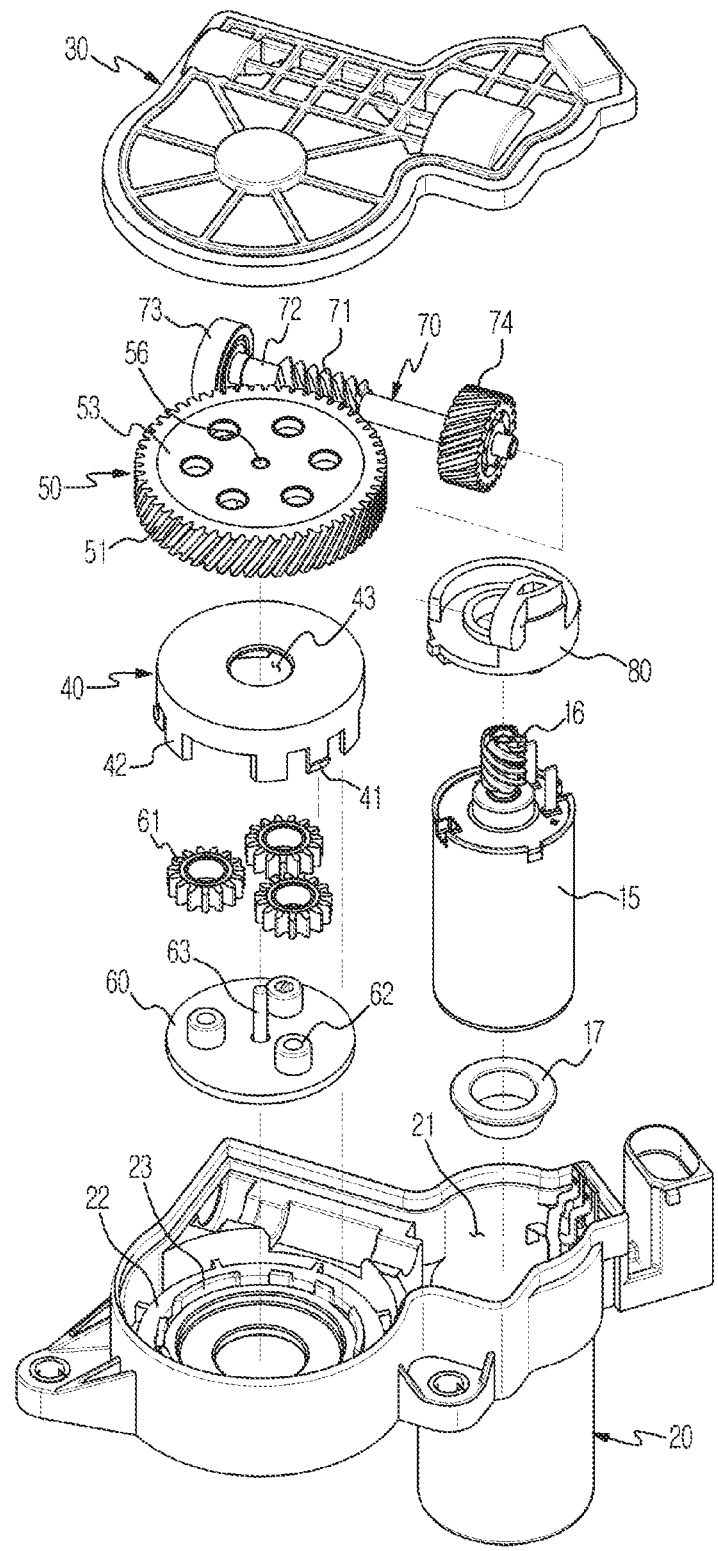
FIG. 2 is an exploded perspective view illustrating an actuator for a brake device according to an embodiment of the present disclosure.
Figure 3:
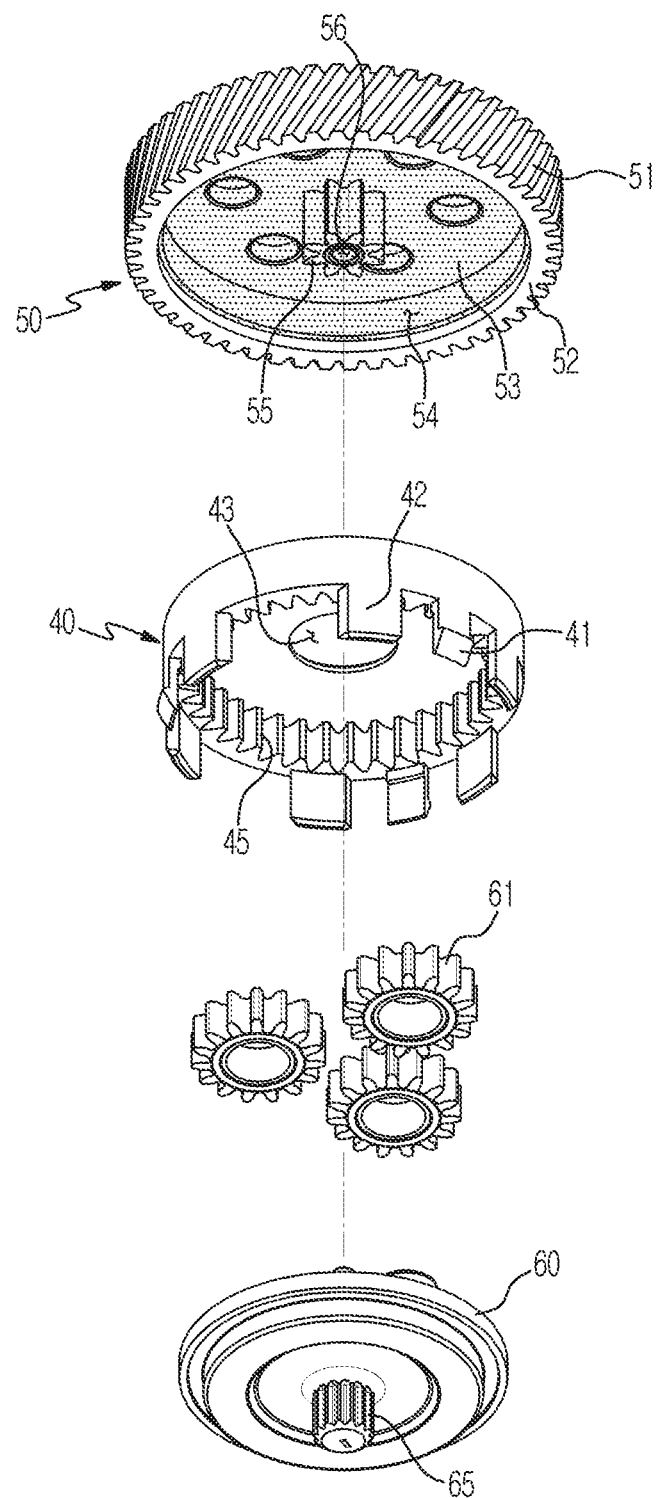
FIG. 3 is an exploded perspective view illustrating a deceleration gear unit of an actuator for a brake device according to an embodiment of the present disclosure.
Figure 4:
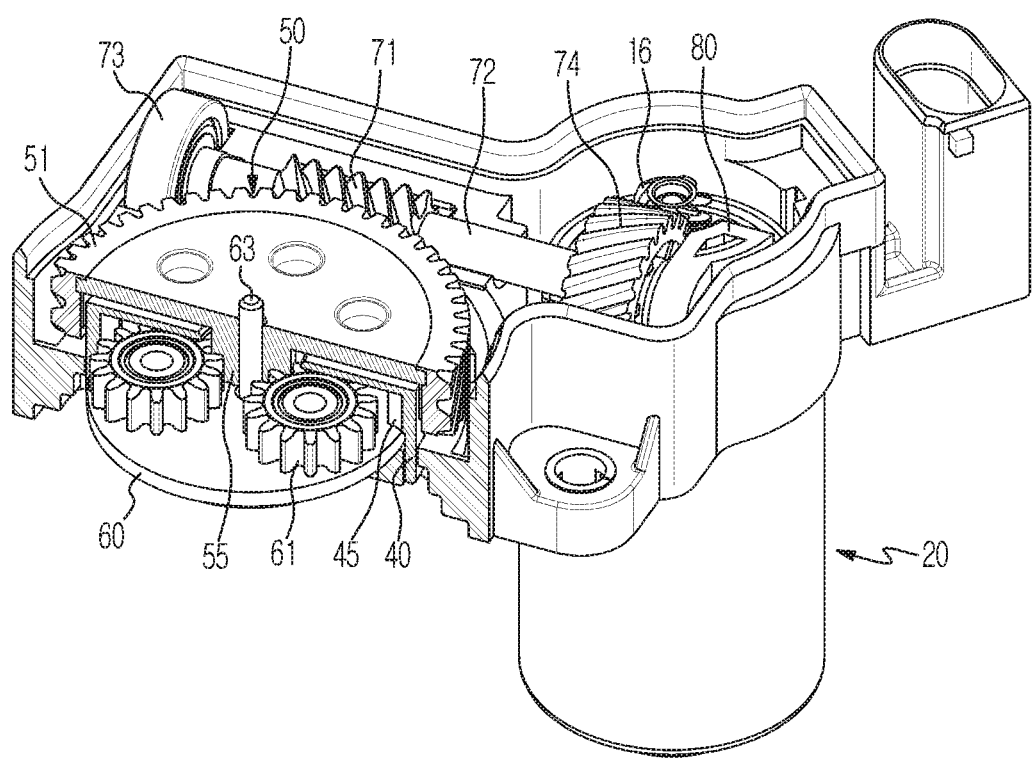
FIG. 4 is a cutaway view illustrating an actuator for a brake device according to an embodiment of the present disclosure.

FIG. 1 is a perspective view illustrating an actuator for a brake device according to an embodiment of the present disclosure. FIG. 2 is an exploded perspective view illustrating the actuator for the brake device according to an embodiment of the present disclosure. FIG. 3 is an exploded perspective view illustrating a deceleration gear unit of the actuator for the brake device according to an embodiment of the present disclosure. FIG. 4 is a cutaway view illustrating the actuator for the brake device according to an embodiment of the present disclosure.

Referring to FIGS. 1 to 4, an actuator 10 for a brake device according to the embodiment of the present disclosure may include a housing 20 provided with a motor accommodation part 21 accommodating a motor 15 therein, and a casing 30 configured to cover an opened upper part of the housing 20.

One end of the housing 20 may be provided with the motor accommodation part 21 accommodating the motor 15 therein, and the other side of the housing 20 may be provided with an extension panel coupled to a gear mounting part 40 to which a deceleration gear unit is mounted.

The motor accommodation part 21 may have a predetermined depth corresponding to a length of the motor 15, and may be formed in an open-top cylindrical shape.

The motor 15 may be inserted into the motor accommodation part 21 through the open top of the motor accommodation part 21.

A damper member 17 configured to support a lower end of the motor 15 may be installed at the bottom of the motor accommodation part 21.

A concave-shape accommodation part configured to accommodate the damper member 17 therein may be installed at the center of a lower end of the motor accommodation part 21.

A gear mounting part 40 may be disposed to neighbor the motor accommodation part 21 in the extension panel 22 that extends in a horizontal direction at the open top of the motor accommodation part 21.

The gear mounting part 40 may be detachably coupled to the housing 40, or may be integrated with the housing 20.

The gear mounting part 40 may be formed in a hollow cylindrical shape in which an upper part is closed and a lower part is open, and may be detachably coupled to the extension panel 22.

A plurality of hooks 41 detachably coupled to the extension panel 22 may be provided at a lower end of the gear mounting part 40.

In addition, at least one coupling rib 42 engaged with a plurality of stopper ribs 23 spaced apart from each other in a circumferential direction at the extension panel 22 may be provided at the lower end of the gear mounting part 40.

When the gear mounting part 40 is mounted on the extension panel 22, the hooks 41 may be inserted into hook grooves formed in the extension panel 22 such that the gear mounting part 40 is fastened to the extension panel 22. In addition, rotation of the gear mounting part 40 may be restricted by interlocking between the stopper ribs 23 and at least one coupling rib 42.

Alternatively, the gear mounting part 40 may be integrated with the extension panel 22.

A shaft hole 43 formed to be penetrated in a vertical direction may be formed at the center of the gear mounting part 40, and a ring gear part 45 may be provided along an inner circumferential direction of the gear mounting part 40.

The ring gear part 45 may be integrated with the gear mounting part 40.

A worm wheel 50 may be rotatably supported at an upper part of the gear mounting part 40.

The worm wheel 50 may include a ring part 52 and a cover part 53. The ring part 52 may be formed to have a through hole at the center part thereof, and may include gear teeth 51 formed in an outer circumference thereof. The cover part 53 covering the upper part of the ring part 52 may be coupled to the ring part 52.

The ring part 52 of the worm wheel 50 may be formed of a synthetic resin material such as plastic, and the cover part 52 may be formed of steel.

The cover part 53 may be coupled to the ring part 52 such that the cover part 53 can cover an open upper part of the ring part 52 and an inner circumferential surface of the ring part 52.

The inner side of the worm wheel 50 may be provided with an accommodation space 54 formed in a shape corresponding to the gear mounting part 40. When the worm wheel 50 is placed on the upper part of the gear mounting part 40, the cover part 53 formed of steel may be supported at the outer surface of the gear mounting part 40, such that frictional resistance encountered during rotation of the worm wheel 50 can be reduced.

A sun gear 55 coupled to the worm wheel 50 so as to be rotated integrally with the worm wheel 50 may be coupled to the cover part 53 at the center of the accommodation space 54.

When the accommodation space 54 of the worm wheel 50 is placed on the gear mounting part 40, the sun gear 55 may pass through the shaft hole 43 of the gear mounting part 40 such that the sun gear 55 may protrude inward from the gear mounting part 40.

A plurality of planetary gears 61 may be inserted into the gear mounting part 40 while being engaged with the sun gear 55.

The plurality of planetary gears 61 may be inserted into the gear mounting part 40 through an open lower part of the gear mounting part 40.

The plurality of planetary gears 61 may be rotatably coupled to at least one planetary-gear shaft part 62 formed in a carrier 60.

Three planetary gears 61 may be arranged in the circumferential direction of the sun gear 55. When the three planetary gears 61 are inserted into the gear mounting part 40, the three planetary gears 61 may be engaged with the outer circumference of the sun gear 55.

The carrier 60 may be formed in a disc (circulate plate) shape, the plurality of planetary-gear shaft parts 62 spaced apart from each other in a circumferential direction by a predetermined distance may be provided at a top surface of the carrier 60, and a carrier shaft part 63 extending upward by passing through the shaft hole 43 of the gear mounting part 40 may be provided at the center of the top surface of the carrier 60.

When the carrier 60 is coupled to the gear mounting part 40, the carrier shaft part 63 may pass through the shaft hole 56 of the sun gear 50 inserted into the gear mounting part 40 through the shaft hole 43 of the gear mounting part 40, and may be rotatably coupled to a shaft support hole formed in the casing 30.

An output shaft 65 may be provided at the center of a bottom surface of the carrier 60. The output shaft 65 may rotate integrally with the carrier 60.

The worm wheel 50 mounted at the upper part of the gear mounting part 40, and the planetary gears 61 and the carrier 60 installed at the lower part of the gear mounting part 40 may construct a deceleration gear unit that reduces rotational force of the motor 15 and provides the reduced rotational force to the output shaft 65.

Constituent elements constructing the above-mentioned deceleration gear unit may be coupled to upper and lower parts of the cylindrical gear mounting part 40 provided in the extension panel 22, such that a compact structure can be formed and assembly of the deceleration gear unit can be improved.

Power transmission from the motor 15 to the deceleration gear unit may be carried out by a worm member 70.

A drive worm 16 for transferring rotational force to the worm member 70 may be coupled to a rotary shaft of the motor 15.

The worm member 70 may include not only a worm shaft 72 having a gear part 71 that is installed at an outer circumferential surface of the worm shaft 72, but also a bearing 73 and a driven worm wheel 74 respectively coupled to both ends of the worm shaft 72.

Each of a screw part of a drive worm 16 and a screw part of the driven worm wheel 74 may be implemented as a helical gear.

A holder 80 configured to rotatably support an end portion of the worm member 70 may be coupled to the upper part of the motor 15.

Various operations of the actuator for use in the brake device according to the embodiment of the present disclosure will hereinafter be described with reference to the attached drawings.

When a driver who rides in a vehicle operates a parking brake of the vehicle after stopping the vehicle, the motor 15 is driven such that the rotary shaft of the motor 15 is rotated. Accordingly, the drive worm 16 coupled to the rotary shaft of the motor 15 is also rotated, such that the driven worm wheel 74 engaged with the drive worm 16 is rotated.

The worm shaft 72 may rotate along with the driven worm wheel 74, and the worm wheel 50 engaged with the gear part 71 provided in the worm shaft 72 may be rotated while being supported by the gear mounting part 40.

The rotational force of the worm wheel 50 may be transmitted to the plurality of planetary gears 61 through the sun gear 55, and the plurality of planetary gears 61 may revolve around the sun gear 55 along the ring gear part 45 formed along the inner circumferential surface of the gear mounting part 40.

Since the carrier 60 is rotated by the plurality of planetary gears 61 revolving around the sun gear 55, the output shaft 65 is also rotated.

As is apparent from the above description, the deceleration gear unit according to the embodiments of the present disclosure may include a space for receiving a sun gear and a planetary gear in a worm wheel, and constituent elements of the deceleration gear unit are installed in upper and lower sides with respect to a cylindrical gear mounting part, such that the actuator can be miniaturized while having higher operational stability.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An actuator for a brake device comprising:
   a housing configured to have not only a motor accommodation part accommodating a motor therein, but also a gear mounting part to which a deceleration gear unit is mounted; and
   a casing coupled to an opened upper part of the housing,
   wherein the gear mounting part is formed in a hollow cylindrical shape in which an upper part is closed and a lower par is opened, and includes not only a shaft hole formed to be penetrated at a center part of a top surface of the gear mounting part, but also a ring gear part formed along in an inner circumference of the gear mounting part, and
   wherein the deceleration gear unit includes:
   a worm wheel configured to have a sun gear that is rotatably supported by an outer surface of the gear mounting part and is inserted into the gear mounting part through the shaft hole;
   a plurality of planetary gears engaged with the sun gear and the ring gear part within the gear mounting part; and
   a carrier coupled to the plurality of planetary gears to be rotatable, and provided with an output shaft.

2. The actuator according to claim 1, wherein the worm wheel includes:
   a ring part formed to be penetrated at a center part thereof, and configured to have gear teeth formed in an outer circumference thereof; and
   a cover part coupled to the ring part to cover an opened upper part of the ring part and an inner surface of the ring part.

3. The actuator according to claim 2, wherein:
   the ring part is formed of a synthetic resin material; and
   the cover part is formed of steel.

4. The actuator according to claim 1, further comprising:
   a worm member configured to transmit rotational force of the motor to the worm wheel.

5. The actuator according to claim 4, wherein the worm member includes:
   a worm shaft provided with a gear part engaged with the worm wheel at an outer circumference thereof; and
   a bearing and a driven worm wheel respectively coupled to both ends of the worm shaft, wherein the motor includes a rotary shaft coupled to a drive worm engaged with the driven worm wheel.

6. The actuator according to claim 1, wherein:
the worm wheel is coupled to an upper part of the gear mounting part in a manner that the gear mounting part is accommodated into the worm wheel; and
the carrier is inserted into and coupled to the gear mounting part at a lower part of the gear mounting part.

7. The actuator according to claim 1, wherein the gear mounting part is detachably coupled to the housing.

8. The actuator according to claim 7, wherein:
the housing includes an extension panel coupled to the gear mounting part,
wherein a hook is detachably coupled to the extension panel at a lower end of the gear mounting part.

9. The actuator according to claim 8, wherein the extension panel includes:
a plurality of stopper ribs spaced apart from each other by a predetermined distance in a circumferential direction; and
at least one coupling rib engaged with the plurality of stopper ribs at the lower end of the gear mounting part.

10. The actuator according to claim 1, further comprising:
a damper member configured to support a lower end of the motor at a bottom surface of the motor accommodation part.

11. The actuator according to claim 1, wherein the worm wheel is provided to cover a top surface and a side surface of the gear mounting part.

12. The actuator according to claim 1, wherein the worm wheel includes an accommodation space therein,
wherein the accommodation space is configured to accommodate the gear mounting part so as to surround the gear mounting part.

13. The actuator according to claim 1, further comprising:
a carrier shaft part configured to penetrate a shaft hole of the sun gear at a center part of the carrier such that the carrier shaft part is rotatably supported by the casing.

* * * * *